(12) United States Patent
Yamada et al.

(10) Patent No.: US 9,070,042 B2
(45) Date of Patent: Jun. 30, 2015

(54) IMAGE PROCESSING APPARATUS, IMAGE PROCESSING METHOD, AND PROGRAM THEREOF

(75) Inventors: Hitoshi Yamada, Osaka (JP); Sheng Mei Shen, Singapore (SG); Bo Li, Singapore (SG); Chin Phek Ong, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 268 days.

(21) Appl. No.: 13/583,646

(22) PCT Filed: Jan. 11, 2012

(86) PCT No.: PCT/JP2012/000106
§ 371 (c)(1),
(2), (4) Date: Sep. 10, 2012

(87) PCT Pub. No.: WO2012/096163
PCT Pub. Date: Jul. 19, 2012

(65) Prior Publication Data
US 2013/0004079 A1 Jan. 3, 2013

(30) Foreign Application Priority Data

Jan. 13, 2011 (JP) ................................ 2011-004937

(51) Int. Cl.
*G06K 9/46* (2006.01)
*G06K 9/00* (2006.01)
*G06T 7/00* (2006.01)

(52) U.S. Cl.
CPC ............ *G06K 9/4642* (2013.01); *G06K 9/4671* (2013.01); *G06T 7/0028* (2013.01); *G06T 2207/10012* (2013.01); *G06T 2207/20021* (2013.01)

(58) Field of Classification Search
None
See application file for complete search history.

(56) References Cited

U.S. PATENT DOCUMENTS 5,293,580 A * 3/1994 Shimizu .................. 382/243
5,617,459 A 4/1997 Makram-Ebeid et al.
(Continued)

FOREIGN PATENT DOCUMENTS

| JP | 11-015951 | 1/1999 |
| JP | 2007-102458 | 4/2007 |
| WO | 2004/077356 | 9/2004 |

OTHER PUBLICATIONS

International Search Report issued Feb. 14, 2012 in International (PCT) Application No. PCT/JP2012/000106.
(Continued)

*Primary Examiner* — Stephen R Koziol
*Assistant Examiner* — Sean Conner
(74) *Attorney, Agent, or Firm* — Wenderoth, Lind & Ponack, L.L.P.

(57) ABSTRACT

To enhance the accuracy of image alignment performed to reduce a vertical disparity between a first image and a second image that are images of the same object captured from different viewpoints, an image processing apparatus according to an aspect of the present invention includes: a division unit which divides each of the first image and the second image into a plurality of sub-regions; and an extraction unit which performs feature point extraction on each of the sub-regions, wherein the extraction unit performs the feature point extraction in such a manner that a value indicating a degree of variation among the sub-regions in total number of extracted feature points is less than or equal to a predetermined value.

7 Claims, 17 Drawing Sheets

(56) References Cited

U.S. PATENT DOCUMENTS

| | | | |
|---|---|---|---|
| 5,731,851 A | 3/1998 | Jung | |
| 5,933,149 A * | 8/1999 | Mori et al. | 345/442 |
| 6,215,914 B1 * | 4/2001 | Nakamura et al. | 382/284 |
| 6,650,362 B1 * | 11/2003 | Nakamura et al. | 348/222.1 |
| 7,054,479 B2 * | 5/2006 | Aucsmith et al. | 382/154 |
| 7,103,211 B1 * | 9/2006 | Medioni et al. | 382/154 |
| 8,224,069 B2 * | 7/2012 | Nakajima | 382/154 |
| 8,260,061 B2 * | 9/2012 | Hirohata | 382/218 |
| 8,358,814 B2 * | 1/2013 | Monden | 382/124 |
| 8,554,016 B2 * | 10/2013 | Manson | 382/294 |
| 8,791,996 B2 * | 7/2014 | Miyajima | 348/116 |
| 2005/0196070 A1 | 9/2005 | Takakura et al. | |
| 2008/0107307 A1 * | 5/2008 | Altherr | 382/107 |
| 2008/0137917 A1 * | 6/2008 | Okubo et al. | 382/118 |
| 2008/0166024 A1 * | 7/2008 | Iketani | 382/107 |
| 2008/0285855 A1 * | 11/2008 | Shiiyama et al. | 382/190 |
| 2009/0052780 A1 | 2/2009 | Kwon et al. | |
| 2009/0067727 A1 * | 3/2009 | Hirohata | 382/201 |
| 2010/0166319 A1 * | 7/2010 | Zhang | 382/201 |
| 2010/0239172 A1 * | 9/2010 | Akiyama | 382/190 |
| 2011/0002544 A1 * | 1/2011 | Oshima | 382/190 |
| 2011/0091065 A1 * | 4/2011 | Chandrashekar et al. | 382/100 |
| 2011/0235899 A1 * | 9/2011 | Tanaka | 382/154 |
| 2012/0014606 A1 * | 1/2012 | Yamazoe et al. | 382/190 |
| 2012/0051665 A1 * | 3/2012 | Adams et al. | 382/294 |
| 2012/0105599 A1 * | 5/2012 | Lin et al. | 348/50 |
| 2013/0129191 A1 * | 5/2013 | Jin et al. | 382/154 |
| 2013/0135439 A1 * | 5/2013 | Kakuko et al. | 348/46 |
| 2013/0307936 A1 * | 11/2013 | Kim | 348/47 |
| 2013/0322688 A1 * | 12/2013 | Tsuchiya et al. | 382/103 |

OTHER PUBLICATIONS

Chinese Office Action and Search Report issued Feb. 17, 2015, in corresponding Chinese Application No. 201280000903.9 (with English translation of Search Report).

Lizhong Wang, "Key technology research of cow somatotype evaluation based on machine vision," Sep. 2, 2009, Wanfang dissertation database, and English translation of pertinent parts, pp. 1-17.

* cited by examiner

IMAGE PROCESSING APPARATUS, IMAGE PROCESSING METHOD, AND PROGRAM THEREOF

BACKGROUND OF THE INVENTION

1. Technical Field

The present invention relates to image processing apparatuses and the like, and in particular to an image processing apparatus and the like which perform image alignment.

2. Background Art

There are techniques of detecting feature points from an image and techniques of extracting, from the detected feature points, a feature point satisfying a predetermined condition. Hereinafter, detection and extraction of feature points is also referred to simply as feature point extraction. The techniques of feature point extraction are widely used in such areas as image matching, recognition of a particular object in an image, image alignment, and calibration performed when generating a 3D image.

In these areas, a feature point is extracted from each of a plurality of images of an object captured from different viewpoints, and then, matching points are found to make up a pair of feature points corresponding to each other between different images.

More specifically, the matching points are a pair of points representing the same spatial position in different images.

For example, suppose a case of generating a stereoscopic image from two images having a predetermined disparity. Here, the two images have a disparity in the horizontal direction as seen from a viewer, which is necessary for stereoscopic viewing. In addition to the horizontal disparity, there is a possibility for the two images to have a vertical disparity caused by erroneous lens assembly or camera movement, for example. The vertical disparity inhibits comfortable stereoscopic viewing. Thus, it is a common practice to transform one of the images according to the other to reduce the vertical disparity. More specifically, it is necessary to generate a warping matrix for warping one of the images to the other based on a certain condition so that the difference in vertical position between corresponding feature points is reduced.

Thus, for the image alignment, first, feature points are extracted from each of the two images. Next, from the extracted feature points, feature points corresponding to each other between the two images are paired up as a matching pair. After that, a warping matrix is generated in such a manner as to reduce the vertical disparity included in the matching pair. Lastly, one of the images is transformed according to the warping matrix. In this way, a favorable stereoscopic image can be generated.

There are many methods for extracting feature points from an image. For example, various feature point extraction methods are known which use, for instance, Speeded-up Robust Feature (SURF) or Scale Invariant Feature Transform (SIFT) which is a feature amount invariant to image transformation such as rotation and scaling.

For example, U.S. Patent Application Publication No. 2009/0052780 (Patent Literature 1) discloses a technique of dividing an image into a plurality of regions for a multiprocessor system. In Patent Literature 1, Difference of Gaussian (DoG) is used for extracting feature points using SIFT. Here, the total number of feature points extracted from each region is variable and determined according to the threshold of DoG.

Furthermore, U.S. Pat. No. 5,731,851 (Patent Literature 2) discloses a feature-point based motion compensation technique. A region is searched for feature points of a moving object, and a grid associated with those feature points is formed with a hierarchical structure for coding purposes.

Moreover, U.S. Pat. No. 5,617,459 (Patent Literature 3) discloses a method of extracting feature points on the contour of an object.

CITATION LIST

Patent Literature

[PTL 1] U.S. Patent Application Publication No. 2009/0052780
[PTL 2] U.S. Pat. No. 5,731,851
[PTL 3] U.S. Pat. No. 5,617,459

SUMMARY OF INVENTION

However, all of the above conventional techniques have a problem of less accurate image alignment due to the fact that the positions of the feature points extracted from one image are unevenly distributed in the image.

As for the feature point extraction according to the conventional techniques, first, a feature amount of each of a plurality of points included in an image is calculated. After that, a point having a feature amount greater than a predetermined threshold is extracted as a feature point.

Here, as the contrast at one point increases, the value of the feature amount of that point increases. Thus, in one image, many feature points are extracted from a high contrast region, whereas almost no feature point is extracted from a low contrast region. This results in less accurate image alignment in the region from which almost no feature point is extracted.

In view of this, it is an object of the present invention to provide an image processing apparatus which enhances the accuracy of the image alignment.

An image processing apparatus according to an aspect of the present invention is an image processing apparatus which extracts feature points for image alignment by which a vertical disparity between a first image and a second image is reduced, the first image and the second image being images of a same object captured from different viewpoints, the image processing apparatus including: a division unit configured to divide each of the first image and the second image into a plurality of sub-regions; and an extraction unit configured to perform feature point extraction on each of the sub-regions, wherein the extraction unit is configured to perform the feature point extraction in such a manner that a value indicating a degree of variation among the sub-regions in total number of feature points extracted by the feature point extraction is less than or equal to a predetermined value.

With this configuration, the image processing apparatus extracts the feature points in such a manner as to reduce the variation in total number of feature points extracted from each sub-region. Thus, the feature points can be extracted in such a manner that they are evenly distributed in the image. As a result, the image processing apparatus can enhance the accuracy of the image alignment.

Note that the present invention can be implemented not only as such an image processing apparatus but also as: an image processing method which includes, as steps, the characteristic elements included in the image processing apparatus; and a program which causes a computer to execute such characteristic steps. Needless to say, such a program can be distributed via a recording medium such as a Compact Disc Read Only Memory (CD-ROM) and a transmission medium such as the Internet.

Furthermore, the present invention can be implemented as: a semiconductor integrated circuit (LSI) which implements part or all of the functions of such an image processing apparatus; and an image processing system which includes such an image processing apparatus.

An image processing apparatus is provided which enhances the accuracy of image alignment by extracting feature points in such a manner that the feature points are evenly distributed in an image.

DETAILED DESCRIPTION OF INVENTION

[Embodiment 1]

Figure 1:
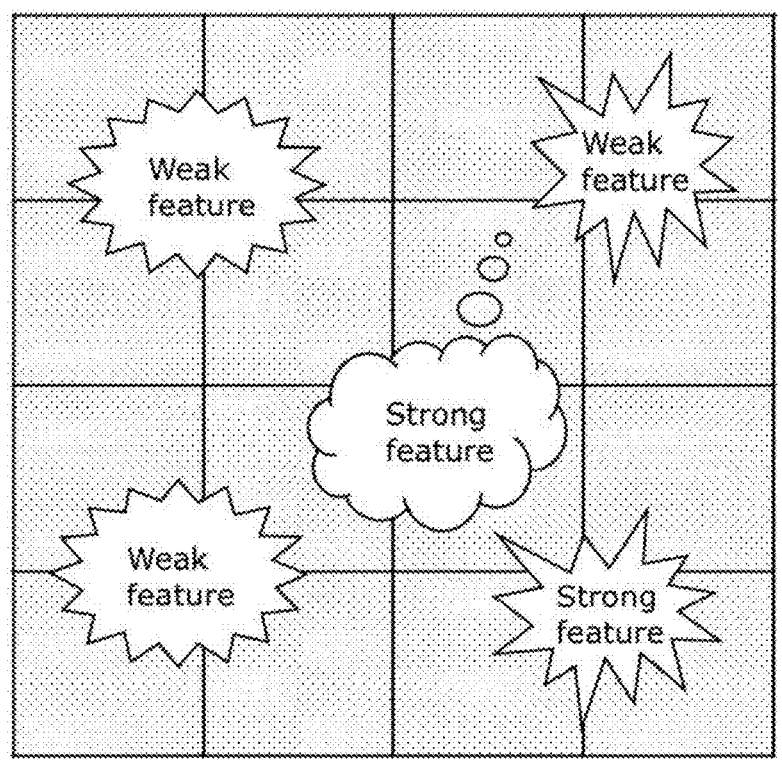
FIG. 1 is a conceptual diagram showing strong features and weak features distributed in an image.

An image processing apparatus according to an aspect of the present invention is an image processing apparatus which extracts feature points for image alignment by which a vertical disparity between a first image and a second image is reduced, the first image and the second image being images of a same object captured from different viewpoints, the image processing apparatus including: a division unit configured to divide each of the first image and the second image into a plurality of sub-regions; and an extraction unit configured to perform feature point extraction on each of the sub-regions, wherein the extraction unit is configured to perform the feature point extraction in such a manner that a value indicating a degree of variation among the sub-regions in total number of feature points extracted by the feature point extraction is less than or equal to a predetermined value.

With this configuration, the image processing apparatus extracts the feature points in such a manner as to reduce the variation in total number of feature points extracted from each sub-region. Thus, the feature points can be extracted in such a manner that they are evenly distributed in the image. As a result, the image processing apparatus can enhance the accuracy of the image alignment.

More specifically, the image processing apparatus may further include an image alignment unit configured to align the first image and the second image based on the feature points, wherein the image alignment unit may be configured to (i) match a feature point included in one of the first image and the second image with a corresponding feature point included in the other one of the first image and the second image, and (ii) perform coordinate transformation on at least one of the first image and the second image so that a difference between vertical coordinates of the matched feature points is reduced, With this, the image processing apparatus can maintain, within a certain range, the total number of feature points extracted from each sub-region.

More specifically, the extraction unit may be configured to perform the feature point extraction in such a manner as to extract, from each of the sub-regions, as many feature points as necessary for making a difference between a predetermined number N and the total number of feature points extracted from the sub-region less than or equal to a predetermined value.

With this, by adjusting the feature point threshold for each of the sub-regions, the image processing apparatus 100 can adjust the total number of feature points extracted from the sub-region.

Furthermore, the extraction unit may include: a feature amount calculation unit configured to calculate, for each of the sub-regions, feature amounts each corresponding to one of a plurality of pixels included in the sub-region; a feature point extraction unit configured to extract, as a feature point, a pixel among the pixels which has a feature amount greater than or equal to a predetermined feature point threshold; and an adjustment unit configured to adjust the feature point threshold for each of the sub-regions so that, for each sub-region, a difference between the predetermined number N and a total number of feature points extracted by the feature point extraction unit is less than or equal to the predetermined value.

With this, the image processing apparatus can generate a fake feature point in place of a lacking feature point. As a result, the image alignment can be performed more accurately even on an image from which a predetermined number of feature points cannot be easily extracted, such as an in having small variance in contrast.

More specifically, the extraction unit may further include a fake feature point generation unit configured to generate a fake feature point in a first sub-region included in the sub-regions, based on feature points extracted by the feature point extraction unit, and the fake feature point generation unit may be configured to generate, in the first sub-region, as many fake feature points as necessary for making a difference between the predetermined number N and a sum of a total number of feature points extracted from the first sub-region and a total number of fake feature points in the first sub-region less than or equal to the predetermined value.

With this, the image processing apparatus can generate a fake feature point in the first image and the second image based on two points already extracted from the first image.

Furthermore, the fake feature point generation unit may include: a first fake point generation unit configured to generate a first fake point based on a first feature point and a second feature point which are included in the first image, the first fake point being a fake feature point in the first image; a reference information obtaining unit configured to obtain reference information including a distance in the first image between the first fake point and the first feature point and a distance in the first image between the first fake point and the second feature point; a corresponding point obtaining unit configured to obtain (i) a third feature point which is included in the second image and corresponds to the first feature point and (ii) a fourth feature point which is included in the second image and corresponds to the second feature point; and a second fake point generation unit configured to generate, in the second image, a second fake point as a fake feature point corresponding to the first fake point, by referring to the reference information.

With this, by adjusting the image contrast for each of the sub-regions instead of adjusting the feature point threshold, the image processing apparatus 100 can adjust the total number of feature points extracted.

Furthermore, the extraction unit may include: a feature amount calculation unit configured to calculate, for each of the sub-regions, feature amounts each corresponding to one of a plurality of pixels included in the sub-region; a feature point extraction unit configured to extract, as a feature point, a pixel among the pixels which has a feature amount greater than or equal to a predetermined feature point threshold; and an adjustment unit configured to adjust an image contrast of each of the sub-regions so that, for each sub-region, a difference between the predetermined number N and a total number of feature points extracted by the feature point extraction unit is less than or equal to the predetermined value.

With this, the image processing apparatus can extract the feature points in such a manner that the difference between the sub-regions in total number of feature points extracted is maintained within a certain range.

Furthermore, the extraction unit may be configured to perform the feature point extraction on each of a first sub-region and a second sub-region, which are included in the sub-regions, in such a manner that a difference between a total number of feature points extracted from the first sub-region and a total number of feature points extracted from the second sub-region is less than or equal to a predetermined threshold, the second sub-region being different from the first sub-region.

Hereinafter, embodiments of an image processing apparatus according to an aspect of the present invention will be described in detail with accompanying drawings.

Note that each of the embodiments described below is a preferable, specific example of the present invention. The numerical values, shapes, structural elements, the arrangement and connection of the structural elements, steps, the processing order of the steps etc. shown in the following embodiments are mere examples, and thus do not limit the present invention. The present invention is limited only by the claims. Thus, among the structural elements in the following embodiments, structural elements not recited in any of the independent claims indicating the most generic concept of the present invention are not essential for achieving the object of the present invention but are described as preferable structural elements.

(Embodiment 1)

FIG. 1 shows distribution of strong features and weak features in an image. Here, the present invention can use any features as the features of an image. For example, the contrast value of each pixel may be used as a feature of an image.

With the conventional feature point extraction, only the feature points having strong features are extracted from the image based on a predetermined threshold. This is to avoid too many feature points being extracted.

However, as mentioned earlier, in the case where the strong features are concentrated in some regions of the image, feature points are extracted only from those regions of the image. This results in a problem of less accurate image alignment.

Figure 2:
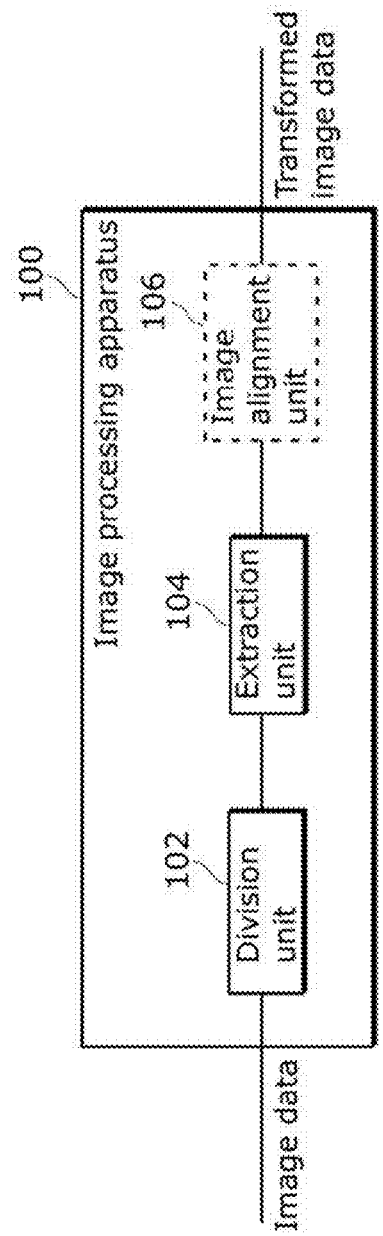
FIG. 2 shows functional blocks of an image processing apparatus according to Embodiment 1 of the present invention.

FIG. 2 shows functional blocks of an it age processing apparatus according to the present embodiment which solves this problem.

An image processing apparatus 100 shown in FIG. 2 is an image processing apparatus which extracts feature points from a first image and a second image, which are images of the same object captured from different viewpoints, in order to align the first image and the second image. The first image and the second image are, respectively, a left-eye image and a right-eye image for stereoscopic viewing, for example.

The image processing apparatus 100 includes a division unit 102, an extraction unit 104, an image alignment unit 106.

The division unit 102 divides, into sub-regions, each of the first image and the second image obtained as image data.

The extraction unit 104 performs feature point extraction on each of the sub-regions. More specifically, the extraction unit 104 performs the feature point extraction in such a manner that a value indicating the degree of variation among the sub-regions in total number of feature points extracted is less than or equal to a predetermined value. More specifically, the extraction unit 104 performs the feature point extraction in such a manner as to extract, from each sub-region, as many feature points as necessary for making the difference between a predetermined number N and the total number of feature points extracted from the sub-region by the feature point extraction less than or equal to a predetermined value. Furthermore, the extraction unit 104 calculates a feature descriptor for each feature point extracted. The specific processing performed by the extraction unit 104 will be described later.

The image alignment unit 106 performs image alignment based on the extracted feature points so that the vertical disparity between the first image and the second image is reduced.

More specifically, the image alignment unit 106 first matches a feature point included in one of the first image and the second image with a corresponding feature point included in the other image. Here, the corresponding feature point refers to a feature point representing the same spatial position.

For example, in the case of using the first image as the reference, the image alignment unit 106 searches, in relation to each feature point included in the first image, for a feature point having a most similar feature descriptor among the feature points included in the second image, so as to match the feature points between the first and second images.

Next, the image alignment unit 106 performs coordinate transformation on at least one of the first and second images so that the difference between the vertical coordinates of the matched feature points is reduced. Note that in this case, the coordinate transformation is performed on the second image with the first image used as the reference. After that, the image alignment unit 106 outputs data representing the second image on which the coordinate transformation has been performed and the first image.

Note that the image processing apparatus 100 does not have to include the image alignment unit 106. In this case, the image processing apparatus 100 outputs the coordinates of the feature points extracted from each of the first image and the second image. The processing performed by the image alignment unit 106 is processing according to the conventional techniques. Thus, the same advantageous effect as that of the present invention can be achieved when, for example, an apparatus outside the image processing apparatus 100 performs the processing equivalent to that of the image alignment unit 106. Furthermore, the image alignment unit 106 does not have to perform the coordinate transformation after matching the feature points between the first image and the second image. In this case, the image alignment unit 106 outputs pairs of coordinates of the matched feature points.

Figure 3:
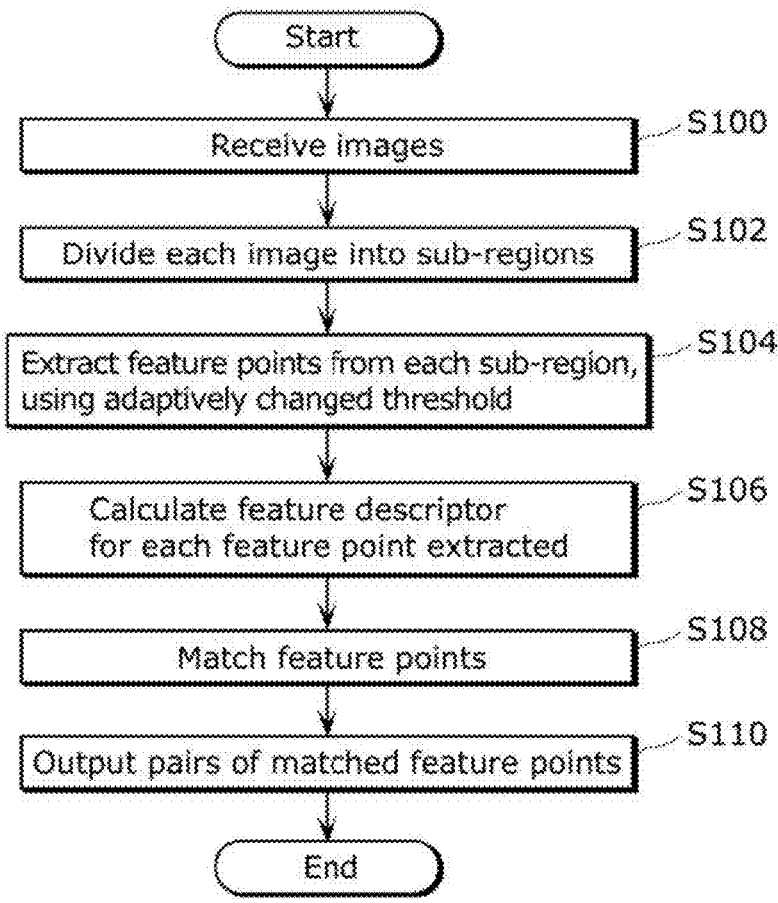
FIG. 3 is a flowchart showing the entire processing performed by an image processing apparatus according to Embodiment 1 of the present invention.

FIG. 3 is a flowchart showing an example of the entire processing performed by the image processing apparatus 100.

First, in Step S100, the image processing apparatus 100 receives a plurality of images (e.g., the first image and the second image).

Next, in Step S102, the division unit 102 divides each of the received images into a plurality of sub-regions. The total number of sub-regions to be obtained from the division is not particularly limited. Furthermore, the first image and the second image may be divided in the same or different manner.

Next, in Step S104, the extraction unit 104 performs the feature point extraction on each of the sub-regions in a serial or parallel manner, using a threshold adaptively changed for each sub-region.

Furthermore, in Step S106, the extraction unit 104 calculates a feature descriptor for each feature point extracted in the previous step.

Next, in Step S108, the image alignment unit 106 matches the feature points between the images. To be more specific, the image alignment unit 106 selects, from the feature points included in the second image, a feature point having a feature descriptor which is most similar to the feature descriptor of a feature point selected from the feature points included in the first image. The two feature points selected in this manner are matched.

After that, in Step S110, a pair of coordinates of the matched feature points is outputted. Note that in Step S108, the image alignment unit 106 may track the feature points instead of matching them.

Note that the image processing apparatus 100 may omit at least one of Step S108 and Step S110. In this case, the same advantageous effect as that of the present invention can be achieved when an apparatus outside the image processing apparatus 100 performs processing equivalent to the omitted step.

Figure 4A:
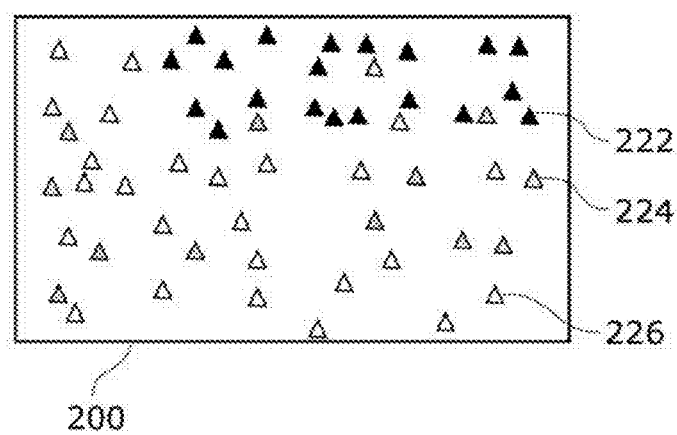
FIG. 4A shows the positions of feature points included in an image.
Figure 4B:
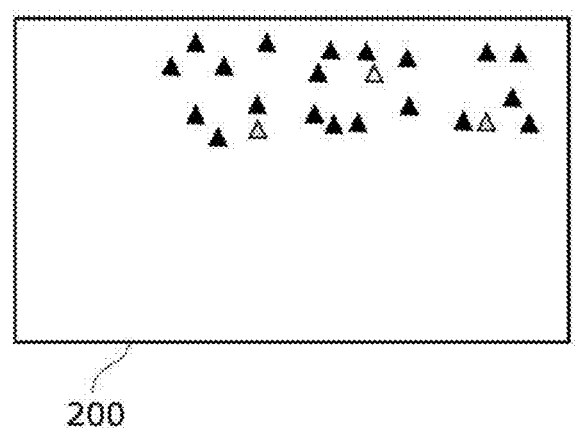
FIG. 4B shows a result of feature point extraction from the image in FIG. 4A, using a conventional technique.
Figure 4C:
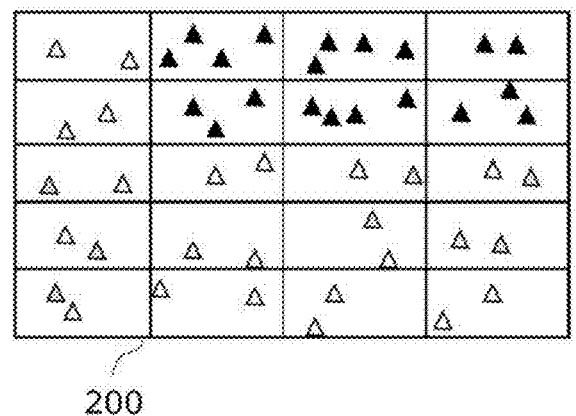
FIG. 4C shows a result of feature point extraction from the image in FIG. 4A, using an image processing apparatus according to Embodiment 1 of the present invention.

Next, referring to FIG. 4A to FIG. 4C, a comparison is made between feature points extracted using a conventional technique and the feature points extracted by the extraction unit 104 included in the image processing apparatus 100.

FIG. 4A shows the positions of feature points included in an image 200. In FIG. 4A, like a feature point 222, feature points denoted by a black triangle have strong features (i.e., the feature amount is large). Furthermore, like a feature point 224, feature points denoted by a dotted triangle have moderate features (i.e., the feature amount is moderate). Furthermore, like a feature point 226, feature points denoted by a white triangle have weak features (i.e., the feature amount is small).

FIG. 4B shows a result of feature point extraction from the image 200 using the conventional technique. According to the conventional technique, a majority of the extracted feature points are feature points having strong features. This is because with the conventional technique, points having a feature amount greater than or equal to a predetermined threshold are extracted as feature points from the entire image 200. As a result, the extracted feature points are concentrated in the upper right of the image 200 as shown in FIG. 4B. Consequently, use of such feature points in generation of a transformation matrix for application such as image alignment results in inaccurate representation of the image as a whole due to the uneven distribution of the feature points.

In contrast, FIG. 4C shows a result of feature point extraction from the image 200 using the image processing apparatus 100 according to the present embodiment. The image processing apparatus 100 extracts feature points from all over the image. The extracted feature points include strong feature points, relatively strong (i.e., moderate) feature points, and weak feature points. As shown in FIG. 4C, even distribution of the extracted feature points makes feature point-based image alignment more robust and stable.

Next, referring to FIG. 5 to FIG. 9, the extraction unit 104 included in the image processing apparatus 100 will be described in more detail.

Figure 5:
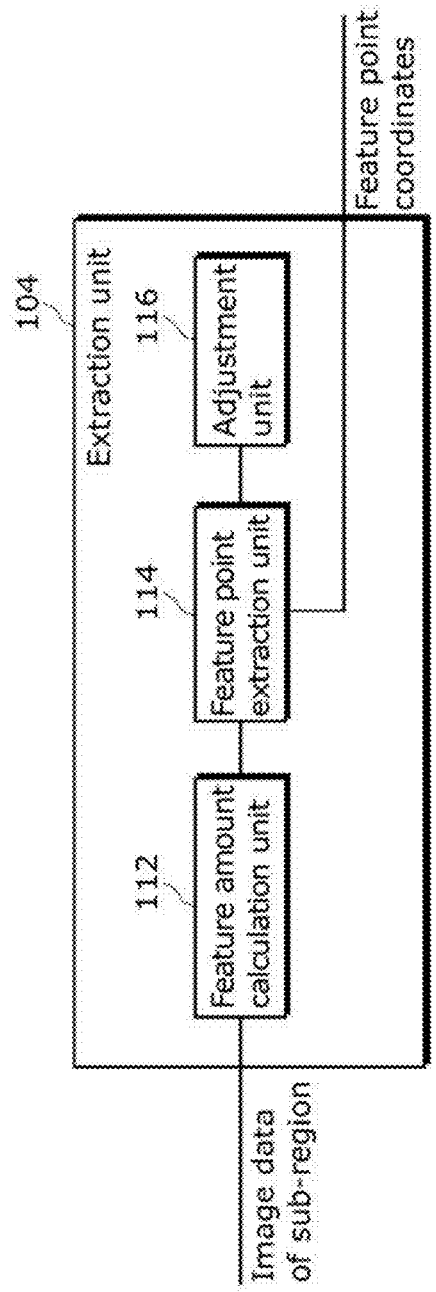
FIG. 5 shows functional blocks of an extraction unit according to Embodiment 1 of the present invention.

FIG. 5 shows functional blocks of the extraction unit 104 according to the present embodiment.

As shown in FIG. 5, the extraction unit 104 includes a feature amount calculation unit 112, a feature point extraction unit 114, and an adjustment unit 116.

The feature amount calculation unit 112 calculates a feature amount for each of pixels included in each of the sub-regions obtained by the division performed by the division unit 102. Although any feature amount can be used as mentioned earlier, the feature amount calculation unit 112 uses the contrast value of the pixels, for example, to calculate the feature amount. To be more specific, a SIFT feature amount, a gradient-based feature amount such as a SURF feature amount, or the like, may be used.

From a plurality of pixels, the feature point extraction unit 114 extracts, as a feature point, a pixel having a feature amount greater than or equal to a predetermined feature point threshold. After that, the feature point extraction unit 114 outputs the coordinates of the extracted feature point.

The adjustment unit 116 adjusts the feature point threshold for each of the sub-regions so that for each sub-region, the difference between the total number of feature points extracted by the feature point extraction unit 114 and the number N predetermined as a target number of feature points to be extracted is less than or equal to a predetermined value.

More specifically, the adjustment unit 116 reduces the feature point threshold when the total number of feature points extracted by the feature point extraction unit 114 is smaller than N. On the other hand, the adjustment unit 116 increases the feature point threshold when the total number of feature points extracted by the feature point extraction unit 114 is larger than N.

Figure 6:
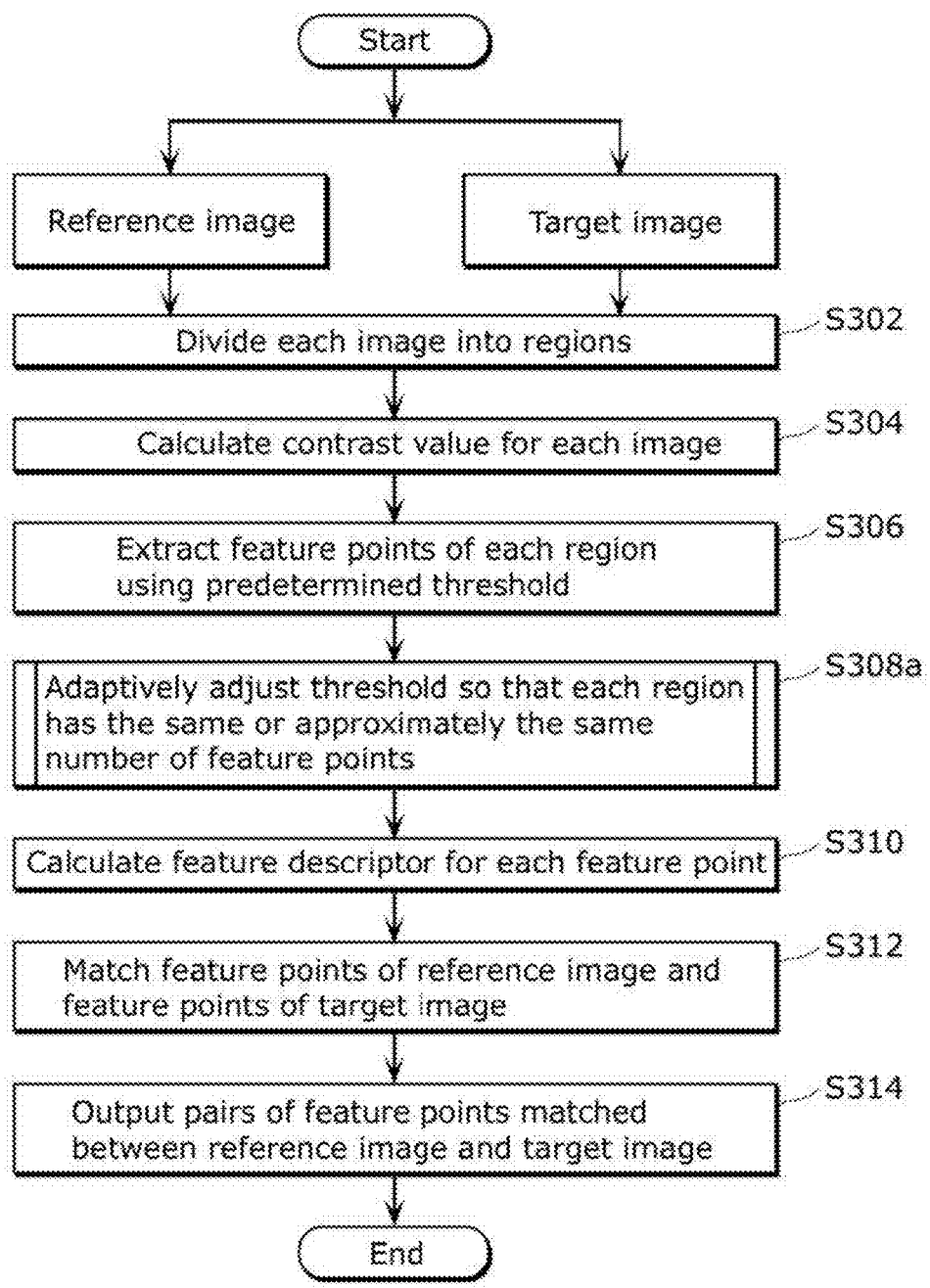
FIG. 6 is a flowchart illustrating in more detail the flow of processing of an image processing apparatus according to Embodiment 1 of the present invention.

FIG. 6 is a flowchart illustrating in more detail the flow of processing of the image processing apparatus 100.

As shown in FIG. 6, first, the division unit 102 divides each of a reference image and a target image into a plurality of sub-regions in Step S302. Note that one of the first image and the second image corresponds to the reference image and the other to the target image.

Next, in Step S304, the extraction unit 104 calculates a contrast value for each sub-region included in the reference image and the target image. In Step S306, the extraction unit 104 performs the feature point extraction on each sub-region based on the contrast value, using a predetermined feature point threshold. Note that the extraction unit 104 may perform the feature point extraction on the sub-regions in a serial or parallel manner.

Next, in Step S308a, the extraction unit 104 adaptively adjusts the feature point threshold, so that each sub-region has a sufficient number of feature points, Note that the extraction unit 104 may adjust the feature point threshold so that the difference between the total number of feature points included in a sub-region and the total number of feature points included in another sub-region is less than or equal to a predetermined value.

Next, in Step S310, the extraction unit 104 calculates a feature descriptor for each feature point extracted. The feature descriptor is, for example, information representing a feature amount for each direction for each feature point extracted. The feature amount is, for example, information indicating the gradient of luminance values which is calculated for each direction.

Next, in Step S312, the image alignment unit 106 matches, between the reference image and the target image, corresponding feature points which represent the same spatial position.

Lastly, in Step S314, the image alignment unit 106 outputs pairs of coordinates of the matched feature points.

Figure 7:
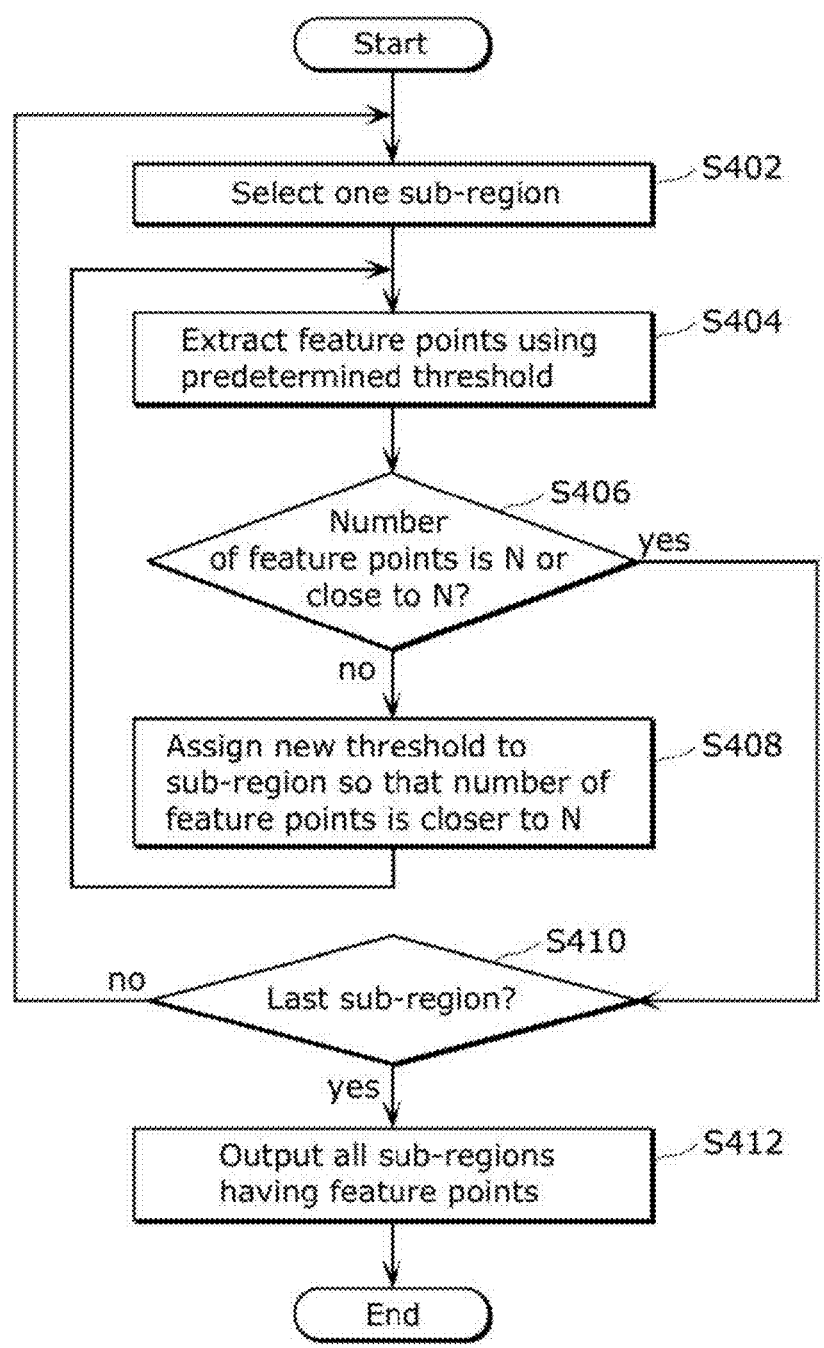
FIG. 7 is a flowchart illustrating in more detail the processing performed by an extraction unit in Step S308a of FIG. 6.

FIG. 7 is a flowchart illustrating in more detail the processing performed by the extraction unit 104 in Step S308a in FIG. 6.

First, in Step S402, the extraction unit 104 selects an arbitrary one of the sub-regions. After that, the feature amount calculation unit 112 calculates a feature amount for each of a plurality of points included in the selected sub-region. For example, the feature amount calculation unit 112 may calculate a feature amount for each of all pixels of the sub-region or for each of pixels evenly sampled from the sub-region.

Next, in Step S404, the feature point extraction unit 114 extracts a feature point from the selected sub-region using a predetermined feature point threshold.

Next, in Step S406, the adjustment unit 116 determines whether the total number of extracted feature points is N or close to N. In other words, the adjustment unit 116 determines whether or not the difference between the total number of extracted feature points and N is less than or equal to a predetermined value.

Here, when the total number of feature points is N or close to N (yes in Step S406), the adjustment unit 116 outputs the feature points extracted from the sub-region.

After that, in Step S410, the extraction unit 104 determines whether or not there is still a sub-region among the plurality of sub-regions which has not yet been selected in Step S402 (i.e., whether or not the sub-region selected in Step S402 is the last sub-region to be processed by the extraction unit 104). Here, when the sub-region selected in Step S402 is not the last sub-region to be processed (no in S410), the extraction unit 104 selects a next sub-region and performs the same processing (S402). When the sub-region selected in Step S402 is the last sub-region to be processed (yes in S410), the extraction unit 104 outputs the coordinates of the extracted feature points for all of the sub-regions in Step S412.

On the other hand, when the difference between N and the total number of extracted feature points exceeds the predetermined value (no in Step S406), the adjustment unit 116 sets a new feature point threshold for the current sub-region in Step S408. More specifically, the adjustment unit 116 increases the feature point threshold when the total number of extracted feature points is greater than N. On the other hand, the adjustment unit 116 reduces the feature point threshold when the total number of extracted feature points is less than N.

After that, the extraction unit 104 again causes the feature point extraction unit 114 to extract feature points from the sub-region (S404).

Figure 8:
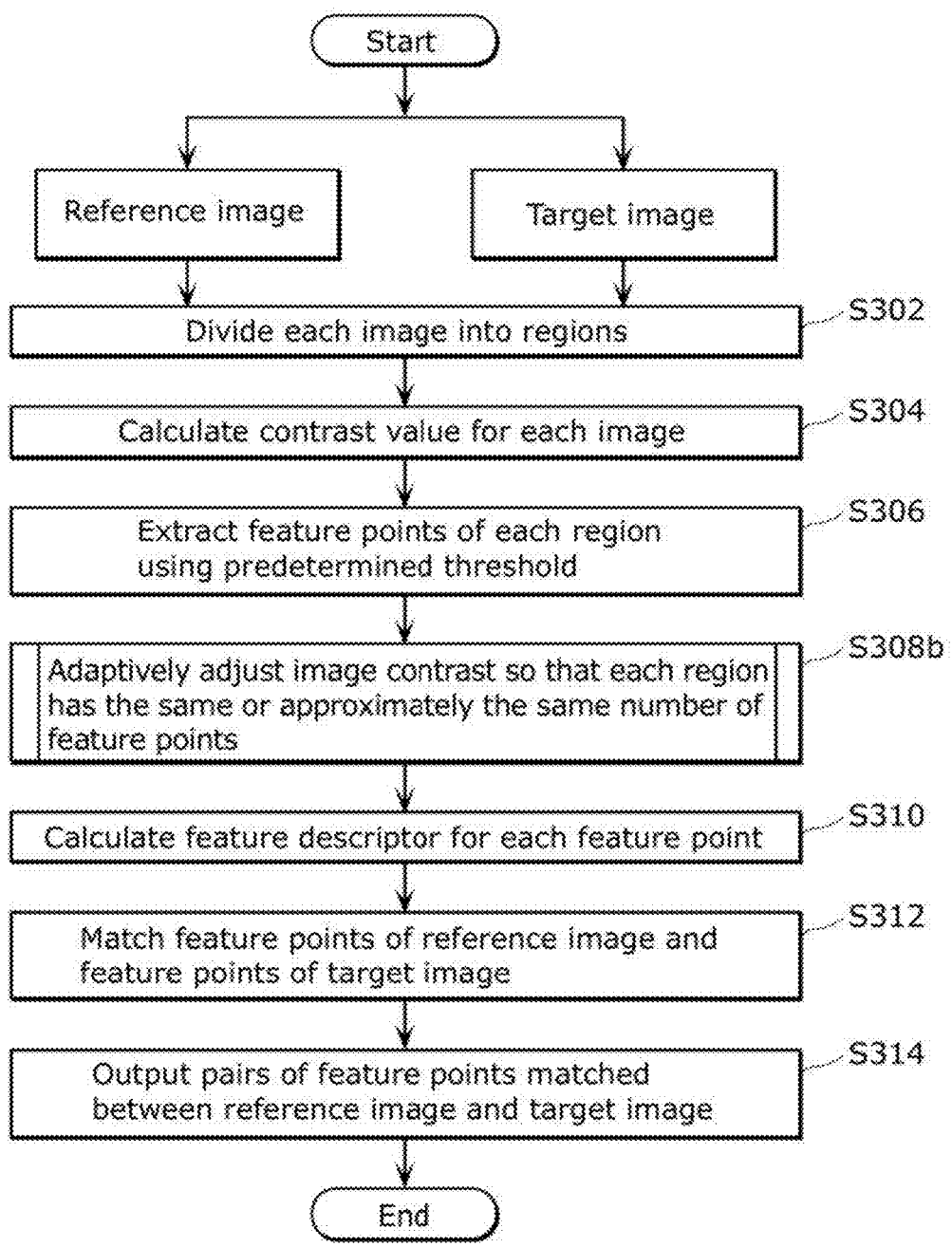
FIG. 8 is a flowchart showing the flow of processing performed by an image processing apparatus in the case where an adjustment unit adjusts contrast for adaptive feature point extraction.
Figure 9:
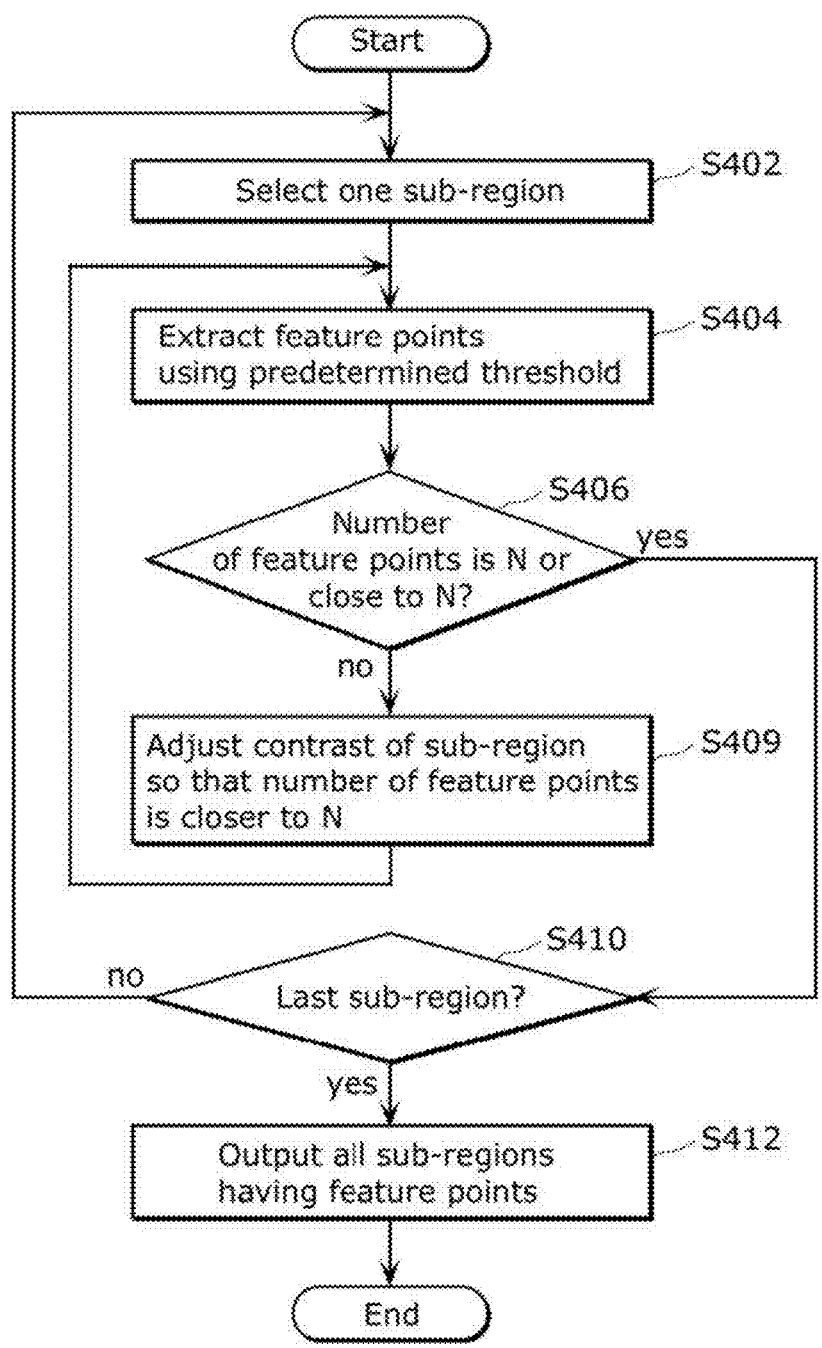
FIG. 9 is a flowchart illustrating in more detail the processing performed by an extraction unit in Step S308b of FIG. 8.

According to the flowchart in FIG. 7, the adjustment unit 116 adjusts the feature point threshold for each sub-region for the feature point extraction. However, instead of adjusting the feature point threshold, the adjustment unit 116 may adjust the image contrast for each sub-region for the feature point extraction. Referring to FIG. 8 and FIG. 9, the details will be described below.

FIG. 8 is a flowchart showing the flow of processing performed by the image processing apparatus 100 in the case where the adjustment unit 116 adjusts the contrast for the adaptive feature point extraction.

Note that the processing shown in FIG. 8 is common with 6 except Step S308b. Thus, described here is the processing in Step S308b.

In Step S308b, the adjustment unit 116 adaptively adjusts the image contrast for each sub-region, so that weak features become clearer. This processing enables the feature point extraction unit 114 to extract the weak features more easily. As a result, the extraction unit 104 can perform the feature point extraction in such a manner as to ensure that each sub-region includes a sufficient number feature points. Note that the extraction unit 104 may adjust the image contrast so that the difference among the sub-regions in total number of feature points included is less than or equal to a predetermined value.

FIG. 9 is a flowchart illustrating in more detail the processing performed by the extraction unit 104 in Step S308b in FIG. 8. Note that Step S409 is the only difference between FIG. 7 and FIG. 9 among the processing performed by the extraction unit 104. Thus, a description will be provided centering on Step S409.

When the difference between N and the total number of extracted feature points exceeds the predetermined value (no in Step S406), the adjustment unit 116 adjusts the contrast of the current sub-region in Step S409. More specifically, the adjustment unit 116 increases the contrast value when the total number of extracted feature points is less than N. On the other hand, the adjustment unit 116 reduces the contrast value when the total number of extracted feature points is greater than N. In this manner, the adjustment unit 116 adaptively adjusts the contrast for each sub-region.

After that, the extraction unit 104 again causes the feature point extraction unit 114 to extract feature points from the sub-region (S404).

That is to say, the extraction unit 104 may include the following: a feature amount calculation unit 112 which calculates, for each of the sub-regions, feature amounts each corresponding to one of a plurality of pixels included in the sub-region; a feature point extraction unit 114 which extracts, as a feature point, a pixel among the pixels which has a feature amount greater than or equal to a predetermined feature point threshold; and an adjustment unit 116 which adjusts an image contrast of each of the sub-regions so that, for each sub-region, a difference between the predetermined number N and the total number of feature points extracted by the feature point extraction unit 114 is less than or equal to the predetermined value.

Figure 10:
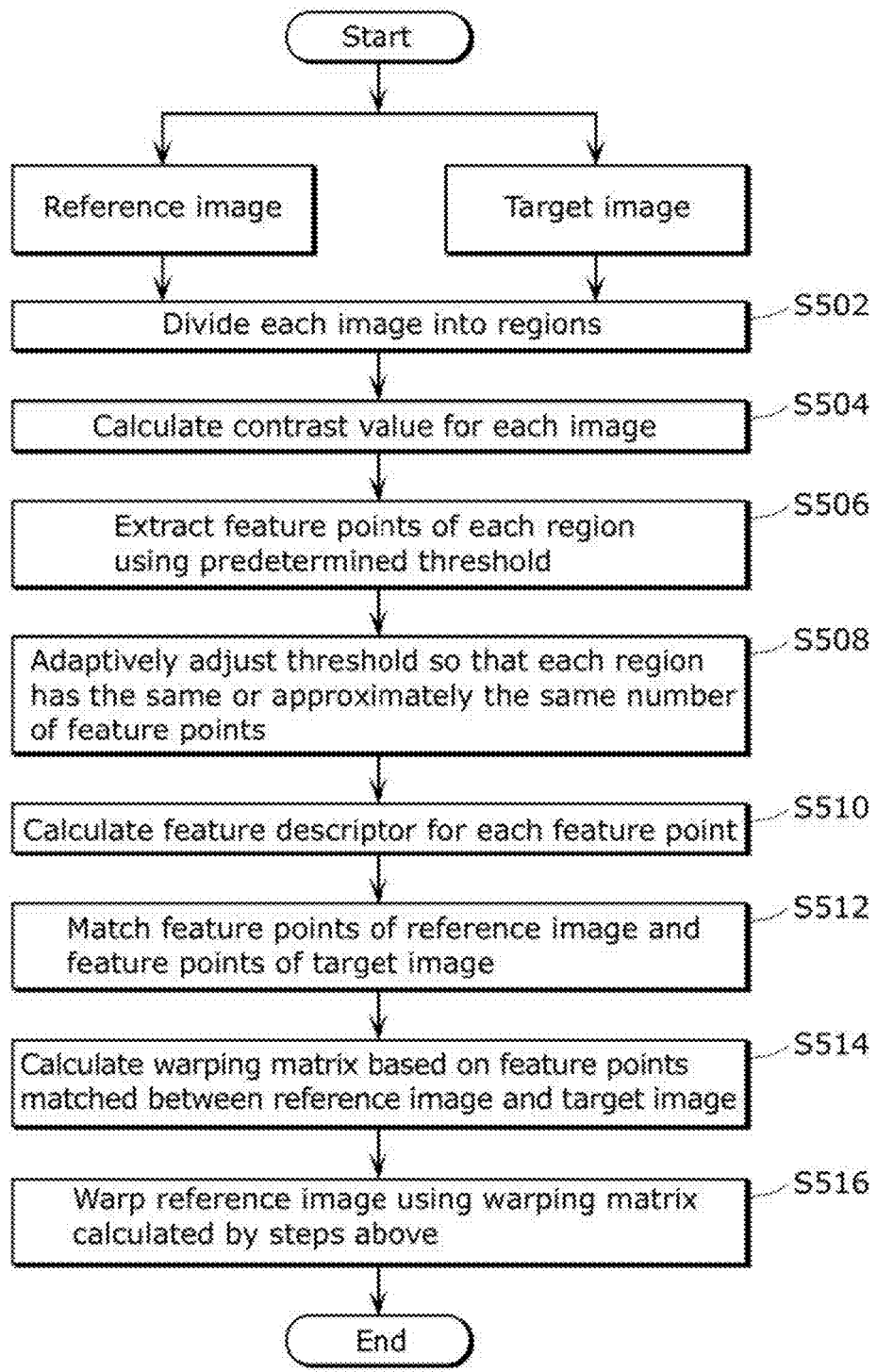
FIG. 10 is a flowchart illustrating the flow of processing for correcting disparity between a reference image and a target image.

Next, referring to FIG. 10, a description will be provided regarding the flow of processing in the case where the image processing apparatus 100 performs coordinate transformation on the reference image to generate two aligned images.

FIG. 10 is a flowchart illustrating the flow of processing performed by the image processing apparatus 100 to correct disparity between the reference image and the target image.

First, in Step S502, the division unit 102 divides each of the reference image and the target image into a plurality of sub-regions.

Next, in Step S504, the extraction unit 104 calculates a contrast value for each image. Based on the contrast value, the extraction unit 104 performs the feature point extraction on each sub-region using a predetermined threshold in Step S506.

Generally, it is difficult to predetermine a threshold with which evenly distributed feature points can be reliably extracted from the images. Thus, the extraction unit 104 in Step S508 adaptively adjusts the threshold to extract, from each sub-region, feature points the total number of which is sufficient for the image alignment and is the same among the sub-regions.

Next, in Step S510, the extraction unit 104 calculates a feature descriptor for each feature point extracted.

Next, in Step S512, the image alignment unit 106 matches the feature points between the reference image and the target image.

Next, in Step S514, the image alignment unit 106 calculates a warping matrix based on the matched feature points. For example, the image alignment unit 106 calculates, as the warping matrix, a matrix which reduces the difference in the vertical coordinates of the matched feature points. Thus, the warping matrix takes the form of an affine transformation matrix or a rotation matrix, for example.

Lastly, in Step S516, the image alignment unit 106 applies the warping matrix to the reference image to adjust the positional relationship between the reference image and the target image for stereoscopic viewing.

As described so far, the image processing apparatus 100 according to the present embodiment divides an image into sub-regions, and adjusts, for each subregion, the threshold used for the feature point extraction, to prevent a large variation among the sub-regions in total number of extracted feature points.

As a result, the feature points can be extracted in such a manner that they are evenly distributed in the image. This means that the image processing apparatus 100 can enhance the accuracy of the image alignment.

Moreover, by performing the matching processing, which is performed after the feature point extraction, on each sub-region, the search in the matching processing can be performed in parallel. This enables the image processing apparatus 100 to perform the image alignment faster.

(Embodiment 2)

Even with the image processing apparatus 100 according to Embodiment 1, extraction of appropriate feature points using the threshold adjustment is difficult in a region having almost no contrast difference, for example.

To solve this problem, an image processing apparatus according to Embodiment 2 generates a fake feature point. The details will be described below.

Figure 11:
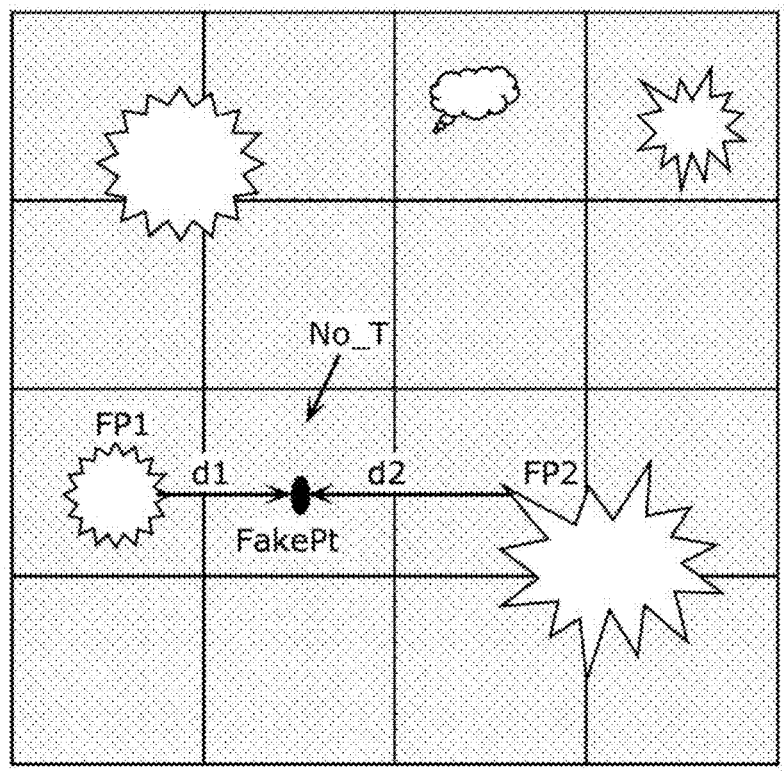
FIG. 11 is a conceptual diagram illustrating generation of a fake feature point performed by an image processing apparatus according to Embodiment 2 of the present invention.

FIG. 11 is a conceptual diagram illustrating generation of a fake feature point. Here, FP1 and FP2 denote two true feature points extracted from the reference image. No_T is a sub-region (textureless region) which does not include texture. In the No_T, a fake feature paint FakePt is shown which has been generated. Here, the position of the fake feature point FakePt is a point derived using the extracted two true feature points by identifying a distance d1 between FakePt and FP1 and a distance d2 between FakePt and FP2.

The same approach is applied to the target image. This means providing, in the target image, a fake feature point at the same distances as d1 and d2 from two true feature points which match the two true feature points in the reference image and are extracted from the target image.

As a result, the fake feature points can be generated in the textureless regions included in the target image and the reference image.

Figure 12:
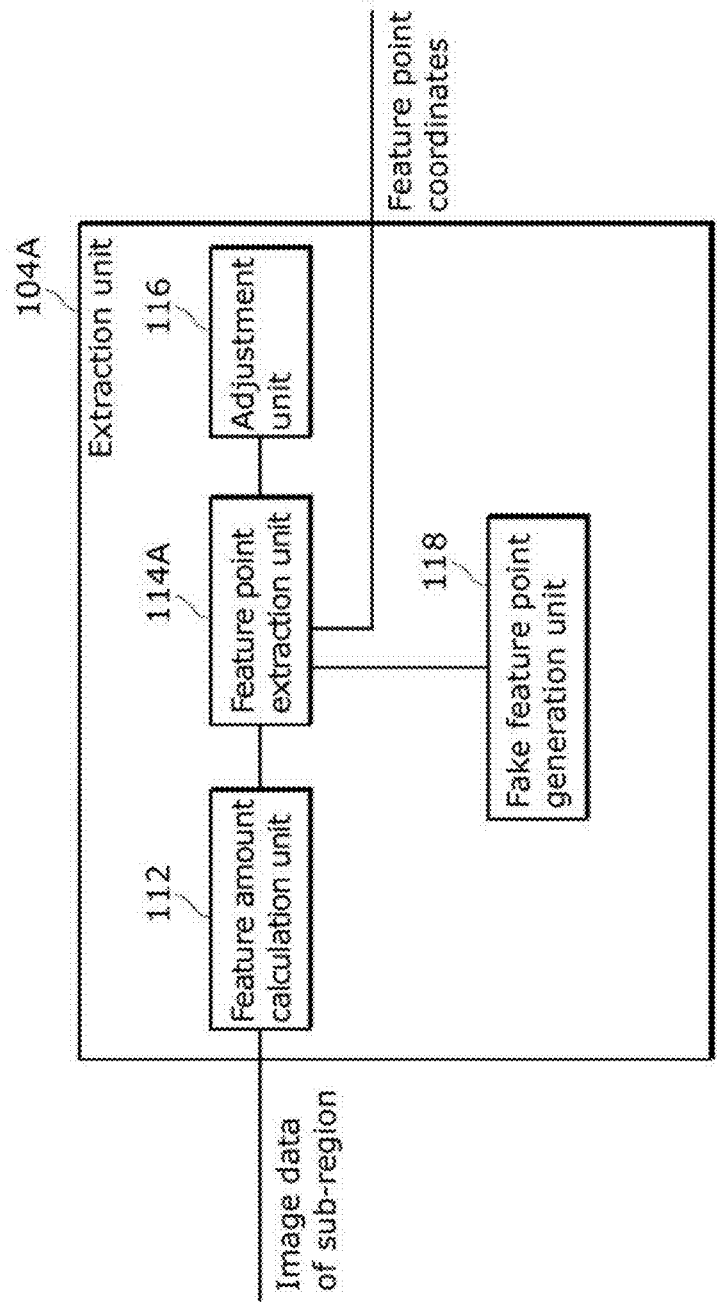
FIG. 12 shows functional blocks of an extraction unit included in an image processing apparatus according to Embodiment 2 of the present invention.

FIG. 12 shows functional blocks of an extraction unit 104A included in the image processing apparatus according to the present embodiment.

As shown in FIG. 12, the extraction unit 104A includes the feature amount calculation unit 112, a feature point extraction unit 114A, the adjustment unit 116, and a fake feature point generation unit 118. Note that the following description centers on the structural elements different from that of the extraction unit 104 shown in FIG. 5.

The feature point extraction unit 114A causes the fake feature point generation unit 118 to generate a fake feature point when determining that a necessary number of feature points cannot be extracted even after the feature point threshold is adjusted by the adjustment unit 116.

The fake feature point generation unit 118 generates a fake feature point in a first sub-region included in a plurality of sub-regions, based on feature points extracted by the feature point extraction unit 114A. To be more specific, the fake feature point generation unit 118 generates, in the first sub-region, as many fake feature points as necessary for making the difference between a predetermined number N and a sum of the total number of feature points extracted from the first sub-region and the total number of fake feature points in the first sub-region less than or equal to a predetermined value.

Here, the first sub-region is a sub-region from which a necessary number of feature points cannot be extracted even after the feature point threshold is adjusted by the adjustment unit 116, due to small variance in luminance. The sub-region denoted by No_T in FIG. 11 is an example of the first sub-region.

Figure 13:
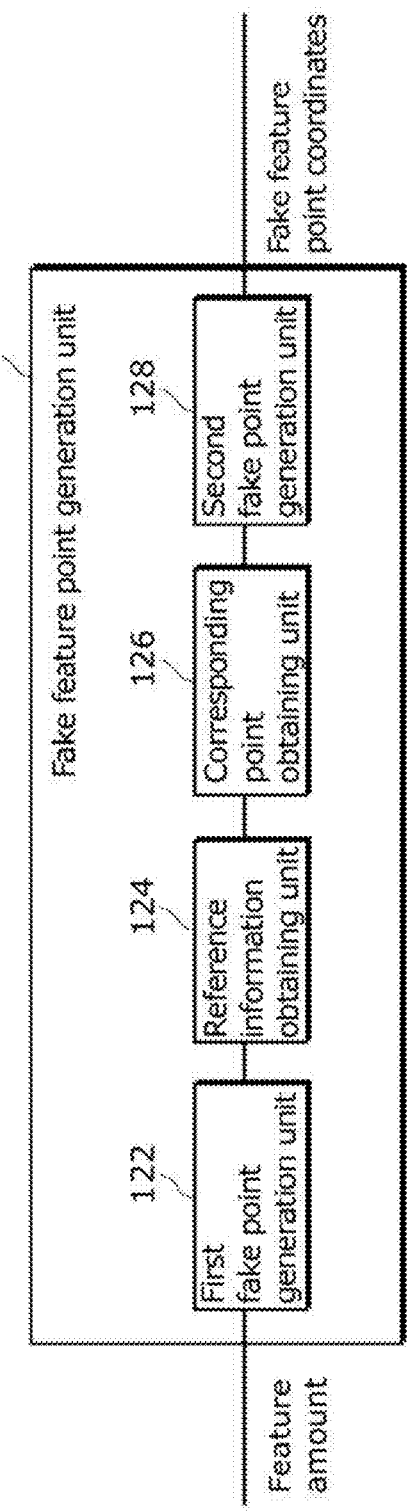
FIG. 13 shows functional blocks of a fake feature point generation unit.

FIG. 13 shows functional blocks of the fake feature point generation unit 118.

As shown in FIG. 13, the fake feature point generation unit 118 includes a first fake point generation unit 122, a reference information obtaining unit 124, a corresponding point obtaining unit 126, and a second fake point generation unit 128.

The first fake point generation unit 122 generates a fake feature point in a first image based on a first feature point and a second feature point which are extracted from the first image by the feature point extraction unit 114A. This fake feature point is also referred to as a first fake point.

The reference information obtaining unit 124 obtains reference information including a distance in the first image between the first fake point and the first feature point and a distance in the first image between the first fake point and the second feature point.

The corresponding point obtaining unit 126 obtains (i) a third feature point which is included in a second image and corresponds to the first feature point and (ii) a fourth feature point which is included in the second image and corresponds to the second feature point.

The second fake point generation unit 128 generates a second fake point in the second image as a fake feature point corresponding to the first fake point, by referring to the reference information.

Figure 14:
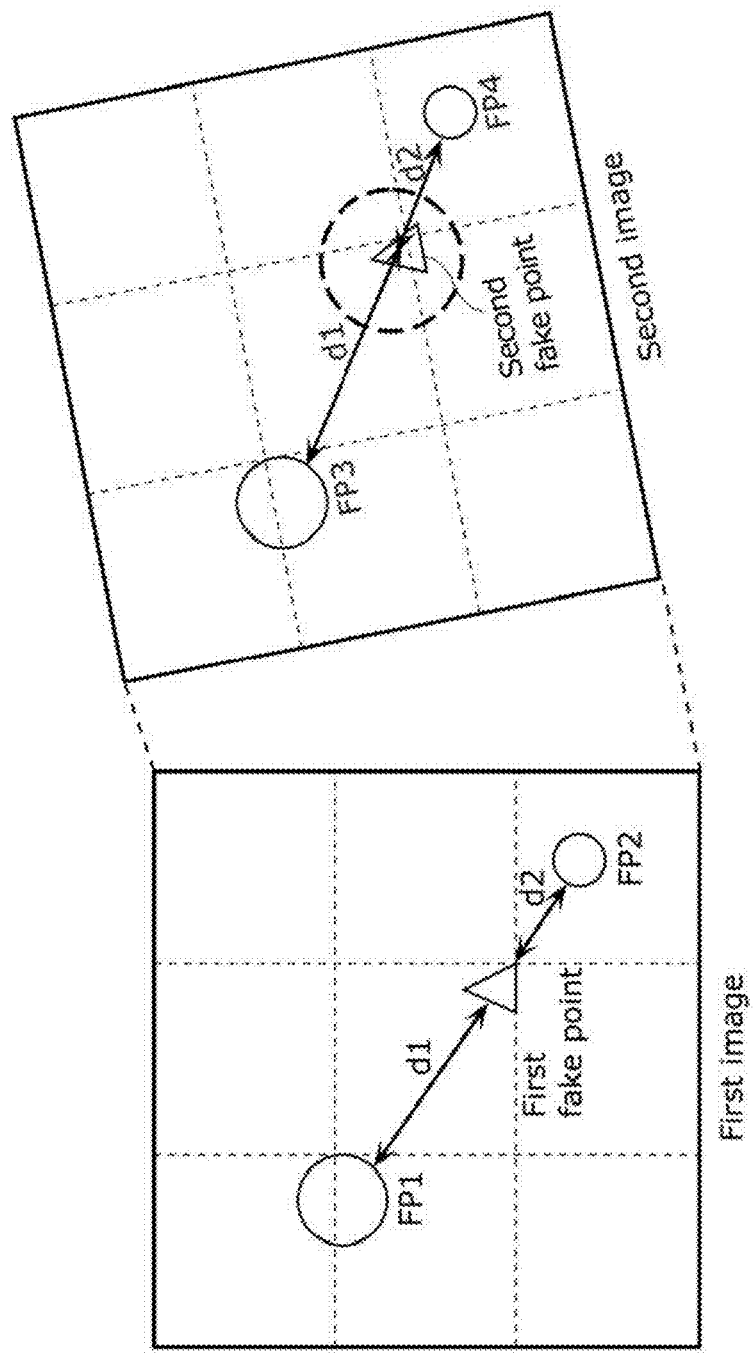
FIG. 14 is a conceptual diagram illustrating in detail the processing performed by a fake feature point generation unit.

More specifically, referring to FIG. 14, the first fake point generation unit 122 first selects, from the plurality of sub-regions, the first sub-region as a sub-region the number of feature points extracted from which is less than the predetermined number N. The first fake point generation unit 122 further selects, for example, the first feature point (also referred to as FP1) and the second feature point (also referred to as FP2) from among the feature points extracted by the extraction unit 104A and located within a predetermined distance from the first sub-region. For example, the first fake point generation unit 122 may select, as FP1, a feature point that is included in a sub-region other than the first sub-region and is closest to the first sub-region, and select, as FP2, a feature point that is included in a sub-region other than the first sub-region and is second closest to the first sub-region.

Next, the first fake point generation unit 122 generates a fake feature point as a point which divides, by a predetermined ratio, a segment connecting FP1 and FP2. Here, the first fake point generation unit 122 may determine the ratio by which the segment connecting FP1 and FP2 is divided, in such a manner that the ratio is proportional to the feature intensity (feature amount) of FP1 and FP2, for example. Alternatively, the ratio may be determined in such a manner that the fake feature point is located in a sub-region from which no feature point has been extracted. Alternatively, the fake feature point may be determined as the midpoint between FP1 and FP2.

Next, the reference information obtaining unit 124 obtains a distance d1 in the first image between FP1 and the fake feature point and a distance d2 in the first image between FP2 and the fake feature point. Information including d1 and d2 is referred to as reference information.

Next, the corresponding point obtaining unit 126 obtains the third feature point (also referred to as FP3) and the fourth feature point (also referred to as FP4) that are extracted from the second image and correspond to FP1 and FP2, respectively. That is to say, FP3 and FP1 correspond to the same spatial position. Likewise, FP4 and FP2 correspond to the same spatial position.

Lastly, the second fake point generation unit 128 refers to the reference information and determines, as a fake feature point, a point located at the distance d1 from FP3 and the distance d2 from FP4. Note that the second fake point generation unit 128 may determine, as a fake feature point, a point which is included in points in a certain area centering on the point located at the distance d1 from FP3 and the distance d2 from FP4 and which has a feature descriptor most similar to the feature descriptor of the fake feature point.

Figure 15:
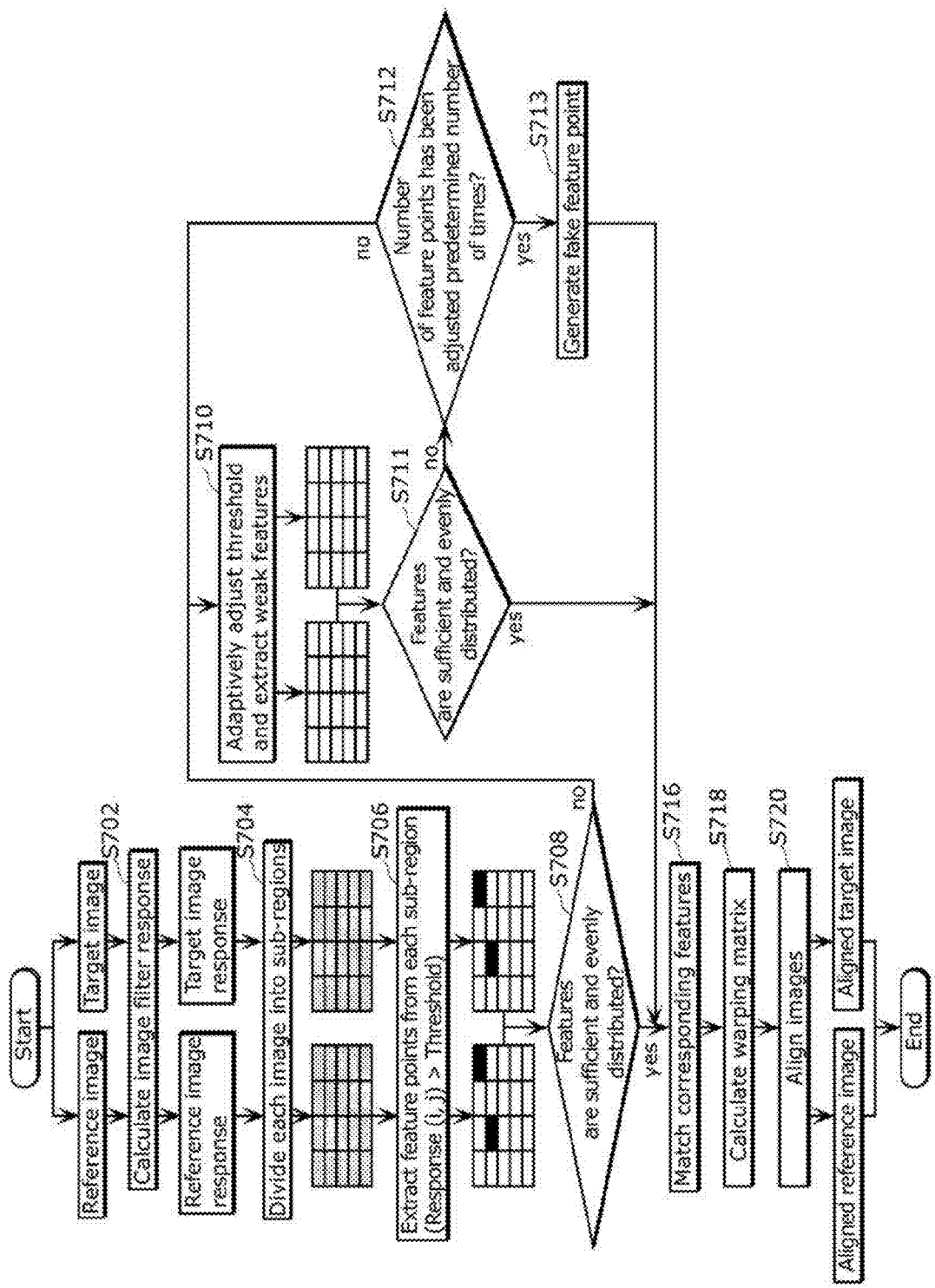
FIG. 15 is a detailed flowchart showing an example of image alignment using a fake feature point, performed by an image processing apparatus according to Embodiment 2.

FIG. 15 shows an example of image alignment using fake feature points according to the present embodiment.

In Step S702, an image filter is applied to a pair of input images, and a response to the image filter application is calculated. Examples of the image filter include a low-pass filter and a band-pass filter.

Next, in Step S704, the division unit 102 divides each image into a plurality of sub-regions. Note that the division unit 102 may divide each image into a plurality of sub-regions at an earlier stage.

Next, in Step S706, the extraction unit 104A performs the feature point extraction on each sub-region. Furthermore, in Step S708, the extraction unit 104A determines whether or not the extracted feature points are sufficient and are evenly distributed over the image. Here, when the extraction unit 104A determines that a sufficient number of feature points are extracted evenly from the entire image (yes in Step S708), the image alignment unit 106 performs matching processing on the extracted feature points in Step S716. Subsequently, in Step S718, the image alignment unit 106 generates a warping matrix using pairs of corresponding feature points which are matched in Step S716. Lastly, in Step S720, the image alignment unit 106 performs image alignment on the pair of images.

On the other hand, when determining that a sufficient number of feature points are not extracted evenly from the entire image (no in Step S708), the extraction unit 104A, in Step S710 adjusts the feature point threshold and extracts feature points having weaker features.

When this leads to the extraction unit 104A determining that a sufficient number of feature points are extracted evenly from the entire image (yes in Step S711), the processing proceeds to Step S716.

On the other hand, when the total number of extracted feature points is insufficient (no in Step S711), the extraction unit 104A, in Step S712, determines whether or not the feature point threshold has been adjusted a predetermined number of times or more. When the feature point threshold has not been adjusted the predetermined number of times yet (no in Step S712), the extraction unit 104A adjusts the feature point threshold again in Step S710. When the feature point threshold has been adjusted the predetermined number of times (yes in Step S712), the fake feature point generation unit 118 generates a fake feature point in Step S713.

As described above, in the case where an image includes a sub-region having contrast that is too low for a feature point to be extracted, the image processing apparatus according to the present embodiment generates, in that image, fake feature points as a pair of the first fake point and the second fake point which corresponds to the first fake point, based on already extracted feature points. As a result, the image processing apparatus can perform the image alignment more accurately by using the pair of fake feature points in addition to the pairs of true feature points extracted by the extraction unit 104.

Figure 16A:
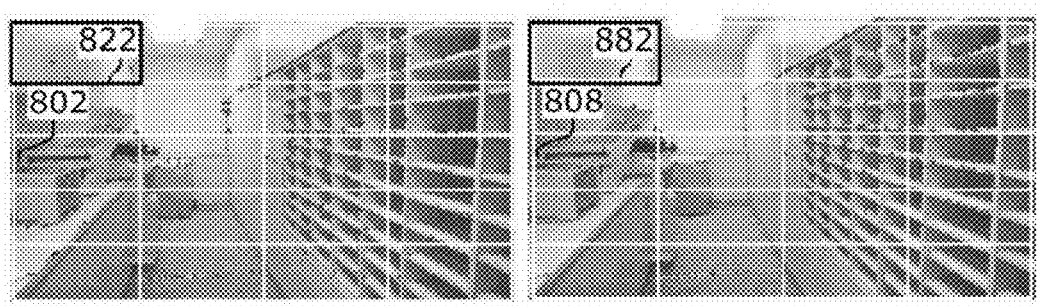
FIG. 16A shows a result of feature point extraction by an image processing apparatus according to Embodiment 1.
Figure 16B:
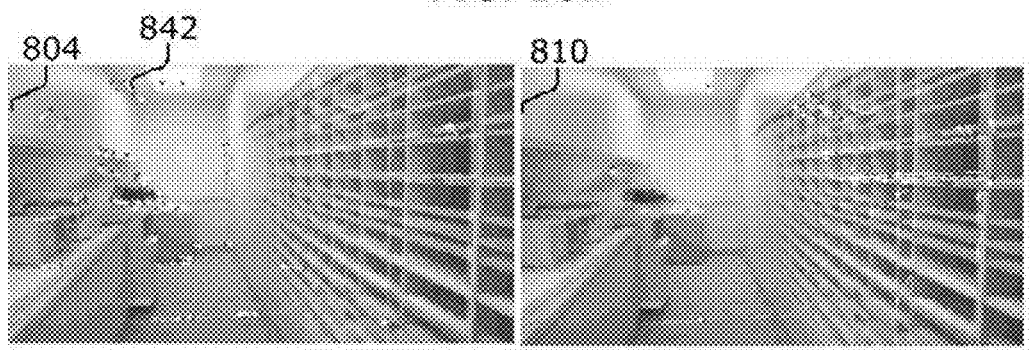
FIG. 16B shows results of matching the feature points shown in FIG. 16A.
Figure 16C:
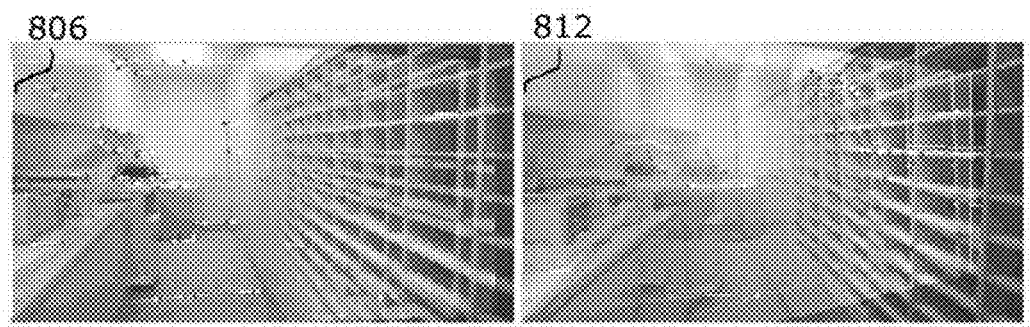
FIG. 16C shows images obtained by overlaying with each other two images having misalignment corrected using pairs of matched feature points.

Next, referring to FIG. 16A to FIG. 16C, the following describes an example of comparison between results of image alignment by the image processing apparatus according to an aspect of the present invention and results of image alignment according to a conventional technique.

An image 802 shown in FIG. 16A, an image 804 shown in FIG. 16B, and an image 806 shown in FIG. 16C show results of feature point extraction by the image processing apparatus according to an aspect of the present invention. On the other hand, an image 808 shown in FIG. 16A, an image 810 shown in FIG. 16B, and an image 812 shown in FIG. 16C show results of feature point extraction by the conventional technique, performed based on the pixel values of pixels included in the entire frame.

First, FIG. 16A shows that several feature points are extracted from a sub-region 822 included in the image 802, while no feature point is extracted from a sub-region 882 included in the image 808. From the image 802, the feature points are extracted in such a manner that they are more evenly distributed over the entire image than in the case of the image 808. More specifically, the feature points in the image 808 are concentrated on the right side of the image. Such an uneven distribution of the feature points adversely affects the results of feature point matching and image alignment as described below.

FIG. 16B shows results of feature point matching. The white lines in the images show misalignment between a pair of matched feature points. To be more specific, the image 804 shows a result of feature point matching performed on two images (e.g., left-eye image and right-eye image) from which feature points have been extracted by the image processing apparatus according to an aspect of the present invention. The image 810 shows a result of feature point matching performed on two images from which feature points have been extracted using the conventional technique.

The matching result shown in the image 804 is that the feature points are more evenly distributed over the image than the feature points in the image 810 showing the matching result of the feature points extracted using the conventional technique. A feature point pair 842 is a pair of feature points matched between the reference image and the target image.

FIG. 16C shows images obtained by overlaying with each other two images having misalignment corrected using pairs of matched feature points. To be more specific, the image 806 is an image obtained by overlaying with each other two images aligned using the image processing apparatus according to an aspect of the present invention. The image 812 is an image obtained by overlaying with each other two images aligned using the conventional technique. In the image 806, the result of the image alignment based on the feature point extraction according to the present invention is more reasonable and consistent over the entire image. More specifically, farther objects have a smaller disparity and nearer objects have a larger disparity. In contrast, in the image 812, the result of the image alignment based on the conventional feature point extraction is incorrect and inconsistent over the entire image. That is to say, farther objects have a larger disparity. As described, the image alignment according to the present invention produces a high quality result in most cases. This shows the usefulness of the even distribution of the feature points extracted using the feature point extraction method performed by the image processing apparatus according to an aspect of the present invention.

Note that the image processing apparatus according to Embodiments 1 and 2 first divides each of the obtained reference image and target image into a plurality of sub-regions. However, the image processing apparatus may extract feature points from the entire image prior to extracting the feature points from each sub-region, and may divide the image into a plurality of sub-regions only when the extracted feature points are unevenly distributed. For example, referring to FIG. 6, the extraction unit 104 extracts feature points from the entire image region of each of the reference image and the target image before the division unit 102 divides each of the reference image and the target image into a plurality of sub-regions in Step S302. After that, the extraction unit 104 may perform the processing from Step S302 onward when the unevenness of the distribution of the extracted feature points over each image is greater than or equal to a predetermined threshold.

By first determining the appropriateness of the distribution over the entire image region, the image processing apparatus can perform the processing more efficiently.

Furthermore, the extraction unit according to Embodiments 1 and 2 makes a comparison between the predetermined number N and the total number of feature points extracted from each sub-region, and adjusts the feature point threshold so that the difference is less than or equal to a predetermined value. However, the extraction unit may adjust the feature point threshold using a different method as long as the feature points can be extracted in such a manner that the degree of variation among the sub-regions in total number of feature points extracted from the sub-region is less than or equal to a predetermined value.

For example, the extraction unit may extract feature points from a first sub-region included in a plurality of sub-regions and from a second sub-region which is included in the sub-regions and is different from the first sub-region, in such a manner that the difference between the total number of feature points extracted from the first sub-region and the total number of feature points extracted from the second sub-region is less than or equal to a predetermined threshold. Furthermore, even in this case, as long as the total number of feature points extracted from either the first sub-region or the second sub-region is less than or equal to a predetermined value M, the extraction unit may extract, from each of the plurality of sub-regions, as many feature points as necessary for making the difference between the predetermined number N and the total number of feature points extracted from that sub-region less than or equal to a predetermined value.

This makes it possible to evenly extract from each of the plurality of sub-regions as many feature points as necessary for accurate image alignment.

Figure 17:
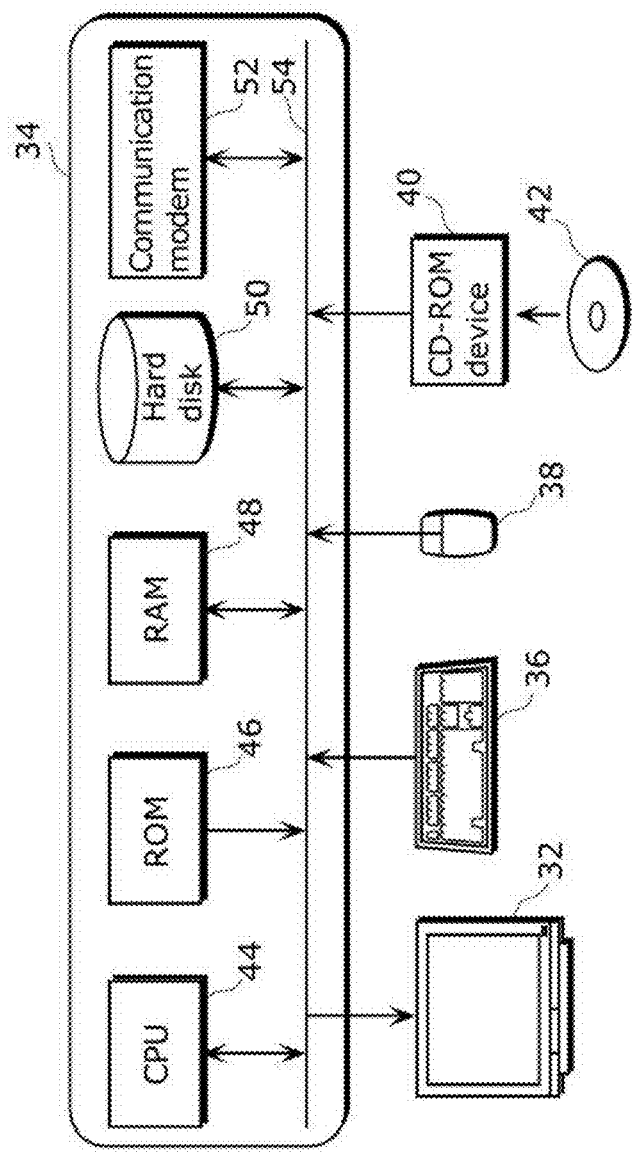
FIG. 17 is a block diagram showing a hardware configuration of a computer system which implements an image processing apparatus according to Embodiments 1 and 2 of the present invention.

Note that the image processing apparatus described in Embodiments 1 and 2 can be implemented by a computer. FIG. 17 is a block diagram showing a hardware configuration of a computer system which implements an image processing apparatus according to an aspect of the present invention.

The image processing apparatus according to an aspect of the present invention includes: a computer 34; a keyboard 36 and a mouse 38 which are used for giving instructions to the computer 34; a display 32 which displays information such as a result of an operation performed by the computer 34; a Compact Disc-Read Only Memory (CD-ROM) device 40 which reads a program run on the computer 34; and a communication modem (not shown).

The program which is processing performed by the image processing apparatus according to an aspect of the present invention is stored in a CD-ROM 42 which is a computer-readable medium. The program is read by the CD-ROM device 40. Alternatively, the program is read by the communication modem 52 via a computer network.

The computer 34 includes a Central Processing Unit (CPU) 44, a Read Only Memory (ROM) 46, a Random Access Memory (RAM) 48, a hard disk 50, a communication modem 52, and a bus 54.

The CPU 44 runs the program read via the CD-ROM device 40 or the communication modem 52. The ROM 46 stores a program and data necessary for the operation of the computer 34. The RAM 48 stores data such as a parameter when the program is run. The hard disk 50 stores a program and data. The communication modem 52 enables communication with another computer via the computer network. The bus 54 mutually connects the CPU 44, the ROM 46, the RAM 48, the hard disk 50, the communication modem 52, the display 32, the keyboard 36, the mouse 38, and the CD-ROM device 40.

Furthermore, part of all of the structural elements included in each of the above-described apparatuses may be configured as a system large scale integrated (LSI) circuit. The system LSI is a super-multifunction LSI manufactured by integrating a plurality of structural elements on a single chip, and is specifically a computer system including a microprocessor, a ROM, a RAM, and so on. A computer program is stored in the RAM. The system LSI achieves its function through the microprocessor's operation according to the computer program.

Moreover, part or all of the structural elements included in each of the above-described apparatuses may be configured as an IC card attachable to each apparatus or as a stand-alone module. The IC card or the module is a computer system including a microprocessor, a ROM, a RAM, and so on. The IC card or the module may include the aforementioned super-multifunction LSI. The IC card or the module achieves its function through the microprocessor's operation according to a computer program. The IC card or the module may be tamper-resistant.

Furthermore, the present invention may be implemented as the methods described above. The present invention may also be implemented as a computer program which causes a computer to perform these methods. Moreover, the present invention may also be implemented as a digital signal including the computer program.

Furthermore, the present invention may also be implemented by storing the computer program or the digital signal on a computer-readable recording medium such as a flexible disc, a hard disk, a CD-ROM, an MO, a DVD, a DVD-ROM, a DVD-RAM, a BD (Blu-ray Disc (registered trademark)), a USB memory, a memory card such as an SD card, and a semiconductor memory. Moreover, the present invention may be implemented as the digital signal recorded on these recording media.

Furthermore, the present invention may be implemented by transmission of the computer program or the digital signal via a telecommunication line, a wireless or wired communication line, a network represented by the Internet, a data broadcast, and so on.

The present invention may also be implemented as a computer system including a microprocessor and a memory, in which the memory stores the computer program and the microprocessor operates according to the computer program.

Furthermore, the present invention can be implemented by another independent computer system by transferring the program or the digital signal recorded on the aforementioned recoding media, or by transferring the program or the digital signal via the aforementioned network and the like.

In addition, the above embodiments and variations may be combined.

The embodiments herein disclosed are provided as mere examples in all aspects, and are not to be construed as limiting the present invention. The scope of the present invention is indicated not by the above description but by the claims, and is intended to include all modifications within the meaning and scope equivalent to the claims.

The present invention is applicable to image processing apparatuses, and in particular to an image processing apparatus and the like which perform image alignment.

REFERENCE SIGNS LIST

32 Display
34 Computer
36 Keyboard
38 Mouse
40 CD-ROM device
42 CD-ROM
44 CPU
46 ROM
48 RAM
50 Hard disk
52 Communication modem
54 Bus
100 Image processing apparatus
102 Division unit
104, 104A Extraction unit
106 Image alignment unit
112 Feature amount calculation unit
114, 114A Feature point extraction unit
116 Adjustment unit
118 Fake feature point generation unit
122 First fake point generation unit
124 Reference information obtaining unit
126 Corresponding point obtaining unit
128 Second fake point generation unit
200, 802, 804, 806, 808, 810, 812 Image
222, 224, 226 Feature point
822, 882 Sub-region
842 Feature point pair

The invention claimed is:

1. An image processing apparatus which extracts feature points for image alignment by which a vertical disparity between a first image and a second image is reduced, the first image and the second image being images of a same object captured from different viewpoints, the image processing apparatus comprising:
a non-transitory memory storing a program; and
a hardware processor configured to execute the program and to cause the image processing apparatus to operate as the following units stored in the non-transitory memory:
a division unit configured to divide each of the first image and the second image into a plurality of sub-regions; and
an extraction unit configured to (i) perform feature point extraction on each of the sub-regions included in the first image and on each of the sub-regions included in the second image, and (ii) output coordinates of a feature point extracted by the feature point extraction, for every one of the sub-regions included in the first image and the second image,
wherein the extraction unit is configured to perform the feature point extraction in such a manner that a value indicating a degree of variation among the sub-regions in a total number of feature points extracted by the feature point extraction is less than or equal to a predetermined value,
the extraction unit is configured to perform the feature point extraction in such a manner so as to extract, from each of the sub-regions, as many feature points as necessary for making a difference between a predetermined number N and the total number of feature points extracted from the sub-region less than or equal to a predetermined value,
the extraction unit includes:
a feature amount calculation unit configured to calculate, for each of the sub-regions, feature amounts each corresponding to one of a plurality of pixels included in the sub-region;
a feature point extraction unit configured to extract, as a feature point, a pixel among the pixels which has a feature amount greater than or equal to a predetermined feature point threshold;
an adjustment unit configured to adjust the feature point threshold for each of the sub-regions so that, for each sub-region, a difference between the predetermined number N and a total number of feature points extracted by the feature point extraction unit is less than or equal to the predetermined value; and
a fake feature point generation unit configured to generate a fake feature point in a first sub-region included in the sub-regions, based on feature points extracted by the feature point extraction unit,
the fake feature point generation unit is configured to generate, in the first sub-region, as many fake feature points as necessary for making a difference between the predetermined number N and a sum of a total number of feature points extracted from the first sub-region and a total number of fake feature points in the first sub-region less than or equal to the predetermined value, and
the fake feature point generation unit includes:
a first fake point generation unit configured to generate a first fake point based on a first feature point and a second feature point which are included in the first image, the first fake point being a fake feature point in the first image;
a reference information obtaining unit configured to obtain reference information including a distance in the first image between the first fake point and the first feature point and a distance in the first image between the first fake point and the second feature point;
a corresponding point obtaining unit configured to obtain (i) a third feature point which is included in the second image and corresponds to the first feature point and (ii) a fourth feature point which is included in the second image and corresponds to the second feature point; and
a second fake point generation unit configured to generate, in the second image, a second fake point as a fake feature point corresponding to the first fake point, by referring to the reference information.

2. The image processing apparatus according to claim 1, further comprising
an image alignment unit configured to align the first image and the second image based on the feature points,
wherein the image alignment unit is configured to
(i) match a feature point included in one of the first image and the second image with a corresponding feature point included in the other one of the first image and the second image, and
(ii) perform coordinate transformation on at least one of the first image and the second image so that a difference between vertical coordinates of the matched feature points is reduced.

3. The image processing apparatus according to claim 1, wherein the extraction unit includes:
a feature amount calculation unit configured to calculate, for each of the sub-regions, feature amounts each corresponding to one of a plurality of pixels included in the sub-region;
a feature point extraction unit configured to extract, as a feature point, a pixel among the pixels which has a feature amount greater than or equal to a predetermined feature point threshold; and
an adjustment unit configured to adjust an image contrast of each of the sub-regions so that, for each sub-region, a difference between the predetermined number N and a total number of feature points extracted by the feature point extraction unit is less than or equal to the predetermined value.

4. The image processing apparatus according to claim 1, wherein the extraction unit is configured to perform the feature point extraction on each of a first sub-region and a second sub-region, which are included in the sub-regions, in such a manner that a difference between a total number of feature points extracted from the first sub-region and a total number of feature points extracted from the second sub-region is less than or equal to a predetermined threshold, the second sub-region being different from the first sub-region.

5. An image processing method for extracting feature points for image alignment by which a vertical disparity between a first image and a second image is reduced, the first image and the second image being images of a same object captured from different viewpoints, the image processing method comprising:
dividing each of the first image and the second image into a plurality of sub-regions; and
performing (i) feature point extraction on each of the sub-regions included in the first image and on each of the sub-regions included in the second image, and (ii) output coordinates of a feature point extracted by the feature point extraction, for every one of the sub-regions included in the first image and the second image,
wherein in the performing of the feature point extraction, the feature point extraction is performed in such a manner that a value indicating a degree of variation among the sub-regions in total number of feature points extracted by the feature point extraction is less than or equal to a predetermined value,
the feature point extraction is performed in such a manner so as to extract, from each of the sub-regions, as many feature points as necessary for making a difference between a predetermined number N and the total number of feature points extracted from the sub-region less than or equal to a predetermined value,
the feature point extraction includes:
calculating, for each of the sub-regions, feature amounts each corresponding to one of a plurality of pixels included in the sub-region;
extracting, as a feature point, a pixel among the pixels which has a feature amount greater than or equal to a predetermined feature point threshold;
adjusting the feature point threshold for each of the sub-regions so that, for each sub-region, a difference between the predetermined number N and a total number of feature points extracted by the feature point extraction unit is less than or equal to the predetermined value; and
generating a fake feature point in a first sub-region included in the sub-regions, based on feature points extracted,
the generating of the fake feature point generates, in the first sub-region, as many fake feature points as necessary for making a difference between the predetermined number N and a sum of a total number of feature points extracted from the first sub-region and a total number of fake feature points in the first sub-region less than or equal to the predetermined value, and
the generating of the fake feature point includes:
generating a first fake point based on a first feature point and a second feature point which are included in the first image, the first fake point being a fake feature point in the first image;
obtaining reference information including a distance in the first image between the first fake point and the first feature point and a distance in the first image between the first fake point and the second feature point;
obtaining (i) a third feature point which is included in the second image and corresponds to the first feature point and (ii) a fourth feature point which is included in the second image and corresponds to the second feature point; and
generating, in the second image, a second fake point as a fake feature point corresponding to the first fake point, by referring to the reference information.

6. A non-transitory computer-readable recording medium for use in a computer, the recoding medium having a computer program recorded thereon for causing the computer to execute the image processing method according to claim 5.

7. An integrated circuit which implements the image processing method according to claim 5.

* * * * *